United States Patent Office 3,470,129
Patented Sept. 30, 1969

3,470,129
CURABLE FILLED CYCLOALIPHATIC EPOXY RESIN MIXTURES
Otto Ernst, Pfeffingen, Ulrich Niklaus, Basel, and Hans Batzer, Arlesheim, Switzerland, assignors to Ciba Limited, Basel, Switzerland, a company of Switzerland
No Drawing. Filed Nov. 22, 1966, Ser. No. 596,069
Claims priority, application Switzerland, Nov. 26, 1965, 16,300/65
Int. Cl. C08g 45/10
U.S. Cl. 260—37     3 Claims

ABSTRACT OF THE DISCLOSURE

Curable resin mixtures which contain as the resin component either a cycloaliphatic epoxy resin and a curing agent for epoxy resins or a pre-condensate from such an epoxy resin and a curing agent, as well as fillers, characterized in that the filler consists at least partially of a nitrogenous compound from the groups of the triazine derivatives, urea, guanidine and derivatives thereof, the said nitrogenous compound having a molecular weight not exceeding 1000, having a melting point over 120° C. and not being appreciably soluble in the resin component at 120° C., and the said nitrogenous compound being present in the mixture in an amount of at least 40 parts by weight, preferably of over 50 up to 400 parts by weight, for every 100 parts by weight of epoxy resin and are particulary useful as casting compositions, particularly for use in the electrical industry. They are also suitable as laminating compositions, molding compositions, coating compositions and the like.

---

It is known to use fillers in castings from casting resin, whereby in many cases the properties of the casting are significantly changed. Thus, it is possible to improve the mechanical properties and, for example, enhance the heat distortion characteristics according to Martens, and quite generally to reduce the cost of the casting resin composition. Other not inconsiderable advantages are the diminished shrinkage experienced in curing the casting resin composition and the less pronounced exothermic reaction. However, most of the known fillers have distinct disadvantages. For example, the abrasive effect associated with the inorganic fillers most frequently used by industry and the increase in the specific gravity of the castings are disadvantageous. Above all, the use of resins extended by means of fillers in the electrical industry is limited by their unsatisfactory stability towards leakage currents and electric arcs, as well as by the generally very substantial increase in the dielectric losses. The use of, for example quartz meal, as filler causes a distinct impairment of the good electrical properties of epoxy casting resins.

To overcome the above-mentioned disadvantages it has already been proposed to use as fillers for epoxy resins alumina trihydrate, alkaline earth metal carbonates (German Patent 1,189,277 of June 7, 1962, to Licentia-Patent-Verwaltungs G.m.b.H., Frankfurt) alkaline earth metal sulphates (French Patent 1,267,518 of Sept. 14, 1960, to Siemens-Schuckertwerke Aktiengesellschaft, Berlin & Erlangen) or alkaline earth metal oxalates (German Patent 1,129,694 of Aug. 17, 1960, to Siemens-Schuckertwerke Aktiengesellschaft, Berlin & Erlangen). While this expedient makes accessible castings that are stable towards leakage currents and in some cases also to electric arcs, the dielectric loss angle $tg\delta$ is not reduced. On the contrary, this angle is greater than with unfilled casting resin compositions or, for an equal loss factor, the electric arc resistance is insufficient, as is the case with ground chalk. The said fillers based on oxalates are, moreover, thermally objectionable because such compounds may decompose at relatively low temperatures. There are also known electrical insulators having a protective coating from material that is stable towards leakage current; with such components there is however a considerable risk of the mechanical or chemical bond between coating and base being insufficient, which may cause an increased risk of electric breakdowns. Finally German Patent 1,137,209 of Aug. 19, 1960, to Norddeutsche Kabelwerke Aktiengesellschaft, Berlin-Neukölln has disclosed a process for the manufacture of castings by hot-curing casting compositions filled with polyethylene or polypropylene. However, when polyethylene or polypropylene are used as fillers there are obtained castings that do not possess satisfactory mechanical properties and are not sufficiently stable towards electric arcs.

When the resin component used is a cycloaliphatic epoxy resin, the above-mentioned disadvantages can be completely or at least substantially overcome and a particularly good arc stability and a low dielectric loss can be achieved by using as fillers certain triazine derivatives, urea, guanidine or derivatives thereof having a molecular weight not exceeding 1000, a melting point above 120° C., and not being appreciably soluble in the resin component at 120°, this filler being used in an amount of at least 40 parts by weight per 100 parts by weight of epoxy resin. Particularly suitable as such fillers are melamine, cyanuric acid and dicyandiamide.

Compared with polyethylene and polypropylene the castings containing fillers of this invention display a distinctly improved behaviour towards the electric arc and possess better mechanical properties.

It is another advantage of the nitrogenous filler of this invention that even a relatively small addition thereof to electrically less suitable fillers, such as quartz meal, produces a substantial improvement.

It is in fact already known from German Patent 947,632 of Dec. 29, 1948, to CIBA Aktiengesellschaft Basel, and from Swiss Patent 257,115 of Aug. 8, 1946, to CIBA Aktiengesellschaft, Basel, to use as curing agents for epoxy resins (prepared by reacting bisphenol A with epichlorohydrin) triazine derivatives, such as melamine or cyanuric acid or dicyandiamide respectively. In this known use as curing agent there are employed per 100 parts by weight of epoxy resins 10 to at most 35 parts by weight of melamine and/or cyanuric acid or 2 to at most 20 parts by weight of dicyandiamide respectively, substantially all of the triazine derivatives or of the dicyandiamide reacting with the epoxy resin during curing, and nothing of the unreacted filler remaining in the cured product.

Furthermore, in German Auslegeschrift No. 1,115,921 of Aug. 26, 1959 to Licentia-Patent Verwaltungs G.m.b.H., Frankfurt it has been proposed to add to a casting resin mixture containing a triazine epoxy resin, an amine curing agent and an aliphatic diglycidyl ether, as a gas donor having a flame-inhibiting action up to 50% of melamine, referred to the weight of the whole resin. This previous publication did not reveal the disclosure of the present invention to the effect that by adding as filler melamine or another triazine derivative the dielectric losses of cured cycloaliphatic epoxy resins can surprisingly be lowered very substantially, the aminotriazine being advantageously used in a porportion of over 50 up to 400 parts by weight for every 100 parts by weight of cycloaliphatic epoxy resin.

Accordingly, the present invention provides curable resin mixtures in which the resin component is either a cycloaliphatic epoxy resin and a curing agent for epoxy resins or a pre-condensate from such an epoxy resin and a curing agent, containing as well fillers, characterized in that the filler consists at least partially of a nitrogenous compound from the groups of the triazine derivatives, urea, guanidine and derivatives thereof, the said nitrogenous compound having a molecular weight not exceeding 1000, having a melting point over 120° C. and not being appreciably soluble in the resin component at 120° C., and the said nitrogenous compound being present in the mixture in an amount of at least 40 parts by weight, preferably of over 50 up to 400 parts by weight, for every 100 parts by weight of cycloaliphatic epoxy resin.

The term "curing" as used in this context indicates the conversion of the above-mentioned resin systems into insoluble and infusible cross-linked products, in general with simultaneous shaping to furnish shaped products, such as castings, mouldings or laminates, or flat structures, such as lacquer films or cemented products.

Triazine derivatives suitable for use as fillers according to this invention are, for example, ammeline, ammelide, melam, formoguanamine, acetoguanamine, benzoguanamine, mono-alkyl-melamines, N-phenylmelamine, N-phenylmelamine, mono-, di-, tri-, tetra-, penta- and hexa-methylmelamines, tetrahydrobenzoguanamine, hexahydrobenzoguanamine and especially cyanuric acid and melamine.

Apart from urea and guanidine itself there may be used as fillers also their salts, for example guanidine carbonate. Good results are obtained especially with derivatives of guanidine, and among them above all with dicyandiamide (=1-cyanoguanidine).

Suitable cycloaliphatic epoxy resins are cycloaliphatic polyepoxy compounds with terminal or inner 1,2-epoxide groups. Particularly suitable terminal 1,2-epoxide groups are 1,2-epoxyethyl or 1,2-epoxypropyl groups. Preferably, there are used 1,2-epoxypropyl groups linked with an oxygen atom, that is to say glycidyl ether or glycidyl ester groups.

As examples of cycloaliphatic polyepoxides containing only terminal 1,2-epoxide groups there may be mentioned the compounds of the following formulae:

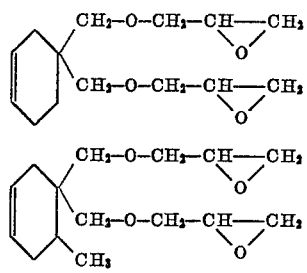

Compounds with inner epoxide groups contain at least one 1,2-epoxide group in an aliphatic chain

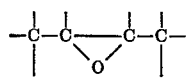

or on a cycloaliphatic ring.

Particularly good results are obtained by using cycloaliphatic epoxy resins that contain at least one inner 1,2-epoxide group attached to a cycloaliphatic ring. As examples there may be mentioned epoxidized cyclic dienes such as 1,2,4,5-diepoxycyclohexane, dicyclopentadiene diepoxide, limonen diepoxide and vinylcyclohexene diepoxide, also cycloaliphatic epoxy ethers, epoxy esters and epoxy acetals containing at least one cycloaliphatic 5- or 6-membered ring to which at least one 1,2-epoxide group is attached, such, for example as the compounds of the following formulae:

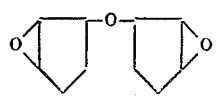

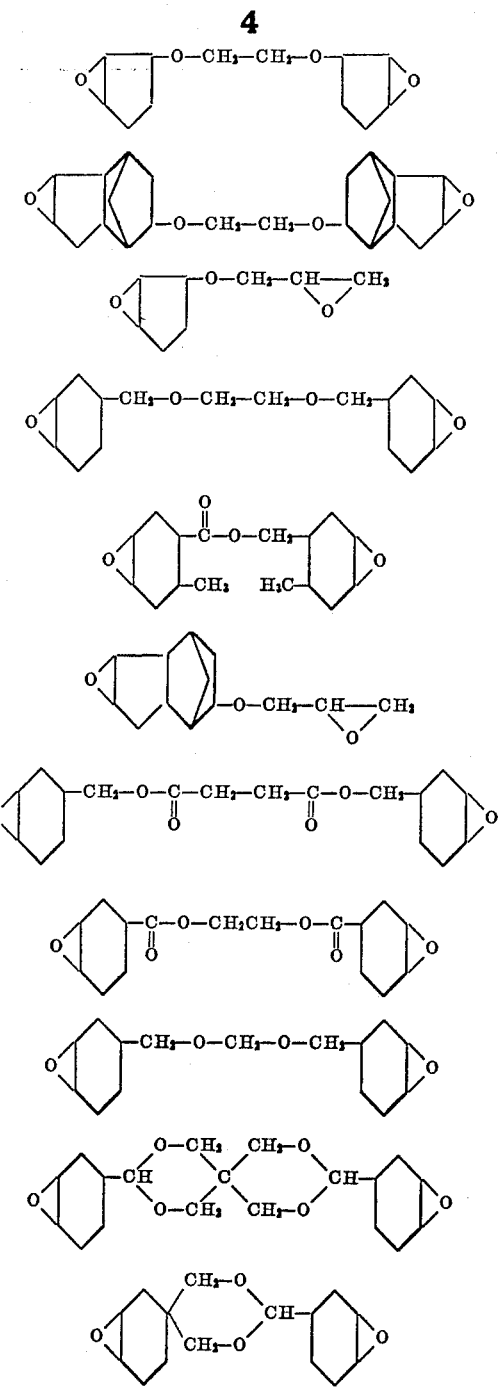

Finally, there are also suitable polymers or telomers containing epoxy groups obtained by polymerization or telomerization respectively of ethylenically unsaturated monoepoxides of the cycloaliphatic series, such as 3,4-epoxycyclohexane - 1,1 - dimethanol acroleinacetal, 3,4-epoxytetrahydro-dicyclopentadienyl-8-allyl ether or 3-vinyl-2,4-dioxospiro-(5.5)-9,10-epoxy-undecane, in the presence of a free radical-forming polymerization catalyst, such as an organic peroxide, and in the given case, of telogens, such as ketones.

There may also be used mixtures of two or more of the cycloaliphatic epoxy resins listed above.

For the curable epoxy resin systems there may be used in principle any known type of curing agent, for example aliphatic, and aromatic primary and secondary tertiary amines, for instance para-phenylenediamine, bis(para-aminophenyl)methane, ethylenediamine, N,N-diethylethylenediamine, diethylenetriamine, tetra(hydroxyethyl)diethylenetriamine, triethylenetetramine, N,N-dimethylpropylenediamine; Mannich's bases such as tris(dimethyl-aminomethyl)phenol; polyamides, for example those from aliphatic polyamines and dimerized or trimerized unsaturated fatty acids; polyhydric phenols, for example resorcinol, bis(4 - hydroxyphenyl)dimethylmethane, phenol-formaldehyde resins, reaction products of aluminium alcoholates or phenolates with compounds or tautomeric reaction of the acetoacetic acid ester type, Friedel-Crafts catalysts, for example $AlCl_3$, $SbCl_5$, $SnCl_4$, $ZnCl_2$, $BF_3$ and their complexes with organic compounds, for example $BF_3$-amine complexes, metal fluoborates such as zinc fluoborate; phosphoric acid; boroxines such as trimethoxy-boroxine.

Preferred curing agents are polybasic carboxylic acids and their anhydrides, for example phthalic anhydride, tetrahydrophthalic anhydride, hexahydrophthalic anhydride, methyl-hexahydrophthalic anhydride, endomethyl-ene-tetrahydrophthalic anhydride, methyl-endomethylene-tetrahydrophthalic anhydride (=methyl nadic anhydride), hexachloro-endomethylene-tetrahydrophthalic anhydride, succinic anhydride, adipic anhydride, maleic anhydride, allylsuccinic anhydride, dodecenylsuccinic anhydride; 7-allylbicyclo(2.2.1)-hept-5-ene-2,3-dicarboxylic anhydride, pyromellitic dianhydride or mixtures of such anhydrides.

If desired, there may be additionally used an accelerator, such as a tertiary amine or a salt or quaternary ammonium compound thereof, for example tris(dimethyl-aminomethyl)phenol, benzyldimethylamine or benzyl dimethyl ammonium phenolate, tin(II)salts of carboxylic acids such as tin(II)octoate or alkali metal alcoholates, for example sodium hexylate.

Instead of such epoxy resin+curing agent systems there may also be used still soluble and fusible, so-called B-stages obtained by pre-condensing a cycloaliphatic epoxy resin with a suitable curing agent, for example a dicarboxylic anhydride, such as phthalic anhydride.

The curable systems based on cycloaliphatic epoxy resins may further contain suitable plasticizers such as dibutylphthalate, dioctylphthalate or tricresylphosphate, inert diluents or so-called active diluents, especially aliphatic or cycloaliphatic monoepoxides, for example butylglycide, cresylglycide, vinylcyclohexene monoxide, 3,4-epoxy-tetra-hydrodicyclopentadienol - 8, 3,4 - epoxyhexahydrobenzal-glycerol or 3,4-epoxycyclohexane-1,1-dimethanol-acrolein-acetal.

It is, of course, also possible to incorporate with the curable resin systems to be used according to this invention further conventional additives such as mould lubricants, antiageing agents, flame-inhibitors, dyestuff or pigments.

The amount of triazine derivative, urea, guanidine or their derivatives added must be at least 40 parts by weight for every 100 parts by weight of epoxy resin. Preferably there are used more than 50 parts and up to 400 parts by weight of nitrogenous filler for every 100 parts by weight of epoxy resin.

When a part of the cycloaliphatic epoxy resin is replaced by another epoxy resin, the amount of nitrogenous filler to be added as directed above is calculated from the total weight of the epoxy resin components.

Apart from the new nitrogenous fillers based on amino-plasts the curable resin mixtures of this invention may contain other known fillers and/or reinforcing agents, for example glass fibres, mica, quartz meal, cellulose, kaolin, ground dolomite, colloidal silica having a large specific surface (Aerosil) or metal powders such as aluminium powder.

The resin mixtures filled according to this invention are mainly used in the casting resin sector. The resulting castings may be used in a wide variety of structural elements especially in the electrical industry, especially for instance as high-voltage insulation support, pin-type and suspension insulators (also on overhead lines), and for insulating components in electrical switchgear such as load shedding switches and quenching chambers, also for grummets and in the construction of voltage and current transformers. The curable resin mixtures are, however, also very suitable for use in other sectors, for instance as laminating resins, bonding agents, moulding compositions, sinter powders, coating compositions, sealing compounds, putties, impregnating and dipping resins.

Unless otherwise indicated, parts and percentages in the following examples are by weight. The relationship between part by volume and part by weight is the same as that between the millilitre and the gram.

EXAMPLE 1

12 parts each of a sodium alcoholate obtained by dissolving 0.82 part of sodium metal at 120° C. in 100 parts of 2,4-dihydroxy-3-hydroxymethylpentane are dissolved for tests 1 to 7 in 100 parts each of the cycloaliphatic polyepoxy resin (epoxy resin A) of the formula

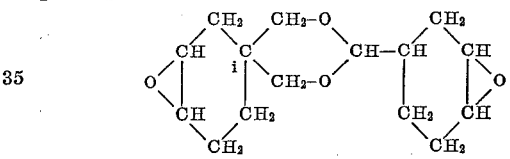

which contains 6.3 epoxide equivalents per kg. The mixtures are heated to 80° C. and 95 parts each of the curing agent hexahydrophthalic anhydride are fused in. Test specimen 1 contains no filler, whereas specimens 2 to 7 comprise the amounts of fillers shown in the following table. "Quartzmehl K8" is the trade name of a commercial silica. To determine the properties listed in this table the specimens are poured at 80° C. into aluminium moulds (40 x 10 x 140 mm.; 130 x 130 x 2 mm.; 130 x 130 x 4 mm.) and all are gelled for 4 hours at 80° C. and then cured for 12 hours at 120° C.

The more favourable behaviour of the cured specimens 4 to 7 of this invention compared with the cured specimens containing known inorganic fillers (specimens 2 and 3) is readily seen, since the dielectric losses of the cured specimens of this invention are much lower even at elevated temperatures.

| Specimen | 1 | 2 | 3 | 4 | 5 | 6 | 7 |
|---|---|---|---|---|---|---|---|
| Epoxy resin A | 100 | 100 | 100 | 100 | 100 | 100 | 100 |
| Hexahydrophthalic anhydride | 95 | 95 | 95 | 95 | 95 | 95 | 95 |
| Sodium alcoholate | 12 | 12 | 12 | 12 | 12 | 12 | 12 |
| Quartzmehl K8 | | 420 | | | | | |
| Alumina hydrate | | | 350 | | | | |
| Melamine | | | | 150 | | | |
| Formoguanamine | | | | | 120 | | |
| Acetoguanamine | | | | | | 150 | |
| Cyanuric acid | | | | | | | 140 |
| Dielectric loss factor tgδ VDE 0303 (50 c.p.s.) in percent: | | | | | | | |
| At 20° C | 0.5 | 3.8 | 3.0 | 0.3 | 0.2 | 0.3 | 0.3 |
| At 100° C | 0.5 | 6.8 | >10 | 0.3 | 0.3 | 0.8 | 0.3 |
| At 150° C | 0.8 | >10 | >10 | 0.8 | 0.8 | 2.3 | 0.3 |
| Arc resistance DIN 53484 (stage) | L4 | L4 | L4 | L4 | L4 | L4 | L4 |
| Heat distortion point accdg. to Martens DIN 53458, in ° C | 182 | 180 | 162 | 154 | 153 | 147 | 170 |

EXAMPLE 2

45 parts each of the curing agent phthalic anhydride are fused at 120° C. into 100 parts each of the epoxy resin A described in Example 1. In addition, in tests 2 to 4 290 parts of "Quartzmehl K8," respectively 290 parts of alumina hydrate, respectively 180 parts of cyanuric acid are admixed as filler. Curing is again performed in aluminium moulds for 4 hours at 120° C. and then for 14 hours at 140° C. The test values shown in the following table clearly prove the superiority of the cured specimen 4 according to this invention.

| Specimen | 1 | 2 | 3 | 4 |
|---|---|---|---|---|
| Epoxy resin A | 100 | 100 | 100 | 100 |
| Phthalic anhydride | 45 | 45 | 45 | 45 |
| Quartzmehl K8 | | 290 | | |
| Alumina trihydrate | | | 290 | |
| Cyanuric acid | | | | 180 |
| Heat distortion point accdg. to Martens DIN, in ° C | 152 | 173 | 178 | 206 |
| Dielectric loss factor tgδ VDE 0303 (50 c.p.s.) in percent: | | | | |
| At 20° C | 1.1 | 2.8 | 2.8 | 0.3 |
| At 100° C | 1.5 | 5.4 | >10 | 0.4 |
| At 150° C | 1.5 | 4.7 | | 0.5 |
| Arc resistance DIN 53484 (stage) | L1 | L1 | L4 | L4 |

EXAMPLE 3

52 parts each of phthalic anhydride as curing agent are fused at 120° C. into 100 parts each of the cycloaliphatic polyepoxy resin (epoxy resin B) of the formula

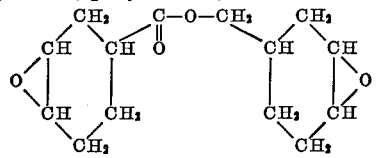

containing 7.1 epoxide equivalents per kg., and then the amounts of filler shown in the following table are admixed. The specimens are poured into aluminium moulds at 120° C. as described in Example 1 and cured for 4 hours at 120° C. and then for 14 hours at 140° C. Compared with the cured specimens containing known fillers the cured specimens 4 and 5 according to this invention display in addition to better heat distortion characteristics according to Martens a better behaviour in the electric arc and at the same time much lower dielectric losses.

| Specimen | 1 | 2 | 3 | 4 | 5 |
|---|---|---|---|---|---|
| Epoxy resin B | 100 | 100 | 100 | 100 | 100 |
| Phthalic anhydride | 52 | 52 | 52 | 52 | 52 |
| Quartzmehl K8 | | 350 | | | |
| Alumina trihydrate | | | 350 | | |
| Melamine | | | | 250 | |
| Cyanuric acid | | | | | 125 |
| Heat distortion point accdg. to Martens DIN 53458, in ° C | 76 | 134 | 152 | 178 | 190 |
| Dielectric loss factor tgδ VDE 0303 (50 c.p.s.) in percent: | | | | | |
| At 20° C | 1.9 | 4.1 | 2.2 | 0.3 | 0.4 |
| At 100° C | 1.9 | 6.5 | >10 | 0.5 | 0.5 |
| At 150° C | 1.6 | 6.5 | | 0.5 | 0.5 |
| Arc resistance DIN 53484 (stage) | L1 | L1 | L4 | L4 | L4 |

EXAMPLE 4

In tests 1 to 5 12 parts each of the sodium alcoholate described in Example 1, 100 parts of the epoxy resin B and 105 parts of the curing agent hexahydrophthalic anhydride are melted together at 80° C. in tests 2 to 5 additionally the following are stirred in respectively: 400 parts of "Quartzmehl K8," 400 parts of alumina trihydrate, 300 parts of benzoguanamine and 300 parts of melamine. The specimens are poured into aluminium moulds and cured for 4 hours at 80° C. and then for 12 hours at 120° C. Compared with the cured specimens 2 and 3, which contain known inorganic fillers, the cured specimens 4 and 5 according to this invention display much lower dielectric losses and have moreover, in contrast to specimen 2 filled with quartz meal, the highest stage 4 of arc resistance.

| Specimen | 1 | 2 | 3 | 4 | 5 |
|---|---|---|---|---|---|
| Epoxy resin B | 100 | 100 | 100 | 100 | 100 |
| Hexahydrophthalic anhydride | 105 | 105 | 105 | 105 | 105 |
| Sodium alcoholate | 12 | 12 | 12 | 12 | 12 |
| Quartzmehl K8 | | 400 | | | |
| Alumina hydrate | | | 400 | | |
| Benzoguanamine | | | | 300 | |
| Melamine | | | | | 300 |
| Dielectric loss factor tgδ VDE 0303 (50 cps.) in percent: | | | | | |
| At 20° C | 0.4 | 2.0 | 3.2 | 0.4 | 0.4 |
| At 100° C | 0.4 | 2.6 | 13.5 | 1.5 | 0.4 |
| Arc resistance DIN 53484 (stage) | L4 | L1 | L4 | L4 | L4 |

EXAMPLE 5

In 100 parts each of a polyglycidyl ester resin liquid at room temperature (viscosity 600 centipoises at 25° C.; containing 6.3 epoxide equivalents per kg.; obtained by reacting epichlorohydrin with hexahydrophthalic acid in the presence of a quaternary ammonium salt, followed by dehydrohalogenation by means of sodium hydroxide solution) there are incorporated at 120° C. 77 parts of the curing agent phthalic anhydride and then there are added in test 1 300 parts of "Quartzmehl K8" and in test 2 150 parts of cyanuric acid. The casting resin mixtures thus obtained are then poured into the aluminium moulds described above and cured for 4 hours at 120° C. and then for 24 hours at 140° C.

Both specimens possess good mechanical properties and the specimen 2 according to this invention displays in addition a much lower specific gravity and substantially lower dielectric losses at room temperature (tgδ at 20° C. according to VDE 0303: 0.2% compared with 2.0%).

EXAMPLE 6

When in the process described in Example 5 the hexahydrophthalic acid is replaced by tetrahydrophthalic acid, a polyglycidyl ester resin having a viscosity of 550 centipoises at 25° C. and containing 6.42 epoxide equivalents per kg. is obtained.

The test specimens are prepared as described in Example 5 with the use of 81 instead of 77 parts of the curing agent phthalic anhydride for every 100 parts of the polyglycidyl ester resin. Again, the specimen of this invention, which contains as filler cyanuric acid, displays at room temperature a considerably improved dielectric loss factor tgδ (0.2 against 1.3%).

What is claimed is:

1. A curable resin composition adapted for the manufacture of structural articles consisting essentially of cured resin having incorporated dispersed filler and having good mechanical and dielectrical properties, said composition comprising as the resin component a member selected from the group consisting of (1) a mixture of (a) a cycloaliphatic epoxy resin and (b) a curing agent for epoxy resins in an amount suitable to cure said compositions to an infusible product, and (2) a still soluble and fusible precondensate from the said epoxy resin (a) and the said curing agent (b), said resin composition further comprising as essential component a filler consisting at least partially of a nitrogenous compound which has a molecular weight not exceeding 1000, has a melting point above 120° C. and is substantially insoluble in the resin component at 120° C. said nitrogenous compound being a member selected from the group consisting of melamine, cyanuric acid, formoguanamine, acetoguanamine, benzoguanamine, guinidine, guanidine salts, dicyandiamide and urea and the said nitrogenous compound being present in the composition in an amount of at least 40 parts by weight for every 100 parts by weight of epoxy resin (a), said filler imparting a high electric arc resistance to the cured composition.

2. A resin composition according to claim 1, wherein the nitrogenous compound used as filler is present in an amount of over 50 and up to 400 parts by weight for every 100 parts by weight of epoxy resin (a).

3. A resin composition according to claim 1, wherein a portion of the cycloaliphatic epoxy resin is replaced by another epoxy resin, and the nitrogenous filler is present in an amount of at least 40 parts by weight for every 100 parts by weight of the total weight of epoxy resins contained in the resin composition.

References Cited

UNITED STATES PATENTS 2,722,561  11/1955  McCullock _____ 252—63.7

FOREIGN PATENTS 938,479  10/1963  Great Britain

MORRIS LIEBMAN, Primary Examiner

L. T. JACOBS, Assistant Examiner